(12) United States Patent
Martinchek et al.

(10) Patent No.: US 9,225,033 B2
(45) Date of Patent: Dec. 29, 2015

(54) FUEL CELL STACK COMPRESSION SYSTEM HAVING INTEGRATED VEHICLE MOUNTS

(71) Applicant: GM Global Technology Operations LLC, Detroit, MI (US)

(72) Inventors: David A. Martinchek, Spencerport, NY (US); David A. Southwick, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 293 days.

(21) Appl. No.: 13/899,665

(22) Filed: May 22, 2013

(65) Prior Publication Data

US 2014/0349205 A1    Nov. 27, 2014

(51) Int. Cl.
*H01M 8/04* (2006.01)
*H01M 8/24* (2006.01)

(52) U.S. Cl.
CPC ............... *H01M 8/248* (2013.01); *H01M 8/24* (2013.01); *Y02E 60/50* (2013.01)

(58) Field of Classification Search
CPC .......... H01M 8/0271; H01M 8/04291; H01M 8/2465; H01M 8/2485; H01M 8/248; Y02E 60/50
See application file for complete search history.

(56) References Cited

U.S. PATENT DOCUMENTS 8,012,648 B2 *    9/2011    Bogumil et al. .............. 429/511
2006/0040166 A1 *    2/2006    Budinski et al. ................. 429/37

* cited by examiner

*Primary Examiner* — Raymond Alejandro
(74) *Attorney, Agent, or Firm* — Dinsmore & Shohl LLP (57) ABSTRACT

A fuel cell system having compression retention features that functions dually to provide compression retention and to provide structural sealing and vehicle mounting capability, eliminating the bulk of an additional structural enclosure while retaining the balance of plant simplicity associated with the use of structural enclosures. The fuel cell system has fuel cells disposed between a dry end unit plate and a wet end unit plate and a compression retention system with a pair of opposing end caps and a pair of opposing side panels such that wet end unit plate is fixedly secured to the opposing end caps and the dry end unit plate is adjustably secured to the opposing end caps. Methods for eliminating the effect of stack height variance and balance of plant tolerances on fuel cell system installation are also provided.

12 Claims, 6 Drawing Sheets

FUEL CELL STACK COMPRESSION SYSTEM HAVING INTEGRATED VEHICLE MOUNTS

TECHNICAL FIELD

The present disclosure relates generally to fuel cell systems and more particularly to compression retention systems for fuel cell stacks in fuel cell systems.

BACKGROUND

Fuel cells are a clean, efficient and an environmentally responsible power source for vehicles and various other applications. The fuel cell is under intense development as a potential alternative for the traditional internal-combustion engine used in modern vehicles. In proton exchange membrane (PEM) type fuel cells, a thin solid electrolytic membrane having an electrode with catalyst adjacent both sides forms a membrane electrolyte assembly (MEA). The MEA generally also includes porous conductive materials known as gas diffusion media (DM), which abut and distribute reactant gases to the anode and cathode. Hydrogen is supplied as fuel to the anode where it reacts electrochemically in the presence of catalyst to produce electrons and protons. The electrons are conducted by circuit from the anode to the cathode, and the protons migrate through the electrolyte to the cathode where oxygen reacts electrochemically in the presence of catalyst to produce oxygen anions. The oxygen anions react with the protons to form water as the fuel cell reaction product.

PEM fuel cells are typically connected in series, stacked one on top of the other to form a fuel cell stack. A fuel cell stack is ordinarily assembled under compression in order to seal the fuel cells and to secure and maintain a low interfacial electrical contact resistance between the reactant plates, the gas diffusion media, and the catalyst electrodes. The interfacial contact resistances in a PEM fuel cell stack decrease substantially with increasing compression loading. A desired compression load on the fuel cell stack typically ranges from about 50 to about 400 psi, and is maintained by a compression retention enclosure housing the fuel cell stack.

To establish the desired retained compressive force, the fuel cell stack is placed in a press, an over-compression is applied, a compression retention system is engaged, the press is released, and the stack is held under a pressure retained by the engaged compression retention system. In some cases the compression retention system is thereafter placed into a separate enclosure for environmental sealing, and in other systems, enclosing side panels may provide any necessary sealing. The enclosed fuel cell stack is then positioned in the vehicle.

Although various compression retention systems are known in the art, the function of the system is generally limited to compression retention and sealing. Systems which additionally perform a structural function by integration with vehicle mounting are not known.

In some existing compression retention system designs, tie rods interconnecting rigid end plates may be used to apply and maintain a compressive force on the fuel cell assembly. The plurality of fuel cells or fuel cell stack to be compressed is interposed between a pair of rigid end plates, and the end plates are then compressed together by tie rods that extend through or around the end plates and impart a compressive force on the end plates. Compressive force is retained by securing the position of the tie rods. Tie rods typically extend beyond the surface of the end plates and thereby increase the volume of the stack structure.

Additional compression retention solutions include, for example, fuel cell side plates having spring elements incorporated therein to control tensile compliance (U.S. Patent Appl. Pub. No. 2006/0040166), and a mechanism utilizing a number of compression bands circumscribing the end plate assemblies in order to secure the stack in a compressed state (U.S. Pat. No. 5,789,091).

Further in accordance with conventional fuel cell stack compression enclosures, the dry end is fixedly located by bolting in position to the endcaps. Since assembled stack height varies, in some cases by as much as 5-10%, the wet end unit floats to accommodate the variation. The wet end is the platform in which the lower end unit, reactant manifolds and balance of parts build from, changes, and this drives design complexities in the balance of the plant. Slip joints may be required to tolerate stack height variation.

Component parameters of the compression retention enclosures are typically set such that accommodation for variation between fuel cell stack build height based on fuel cell stack component variance or vehicle balance of plant component parameter variance is problematic.

It would be advantageous to provide a compression retention system which accommodates fuel cell stack height variation at the dry end and which is structurally integrated with vehicle mounting.

SUMMARY OF THE DISCLOSURE

Accordingly, the present investigators have developed a fuel cell system that overcomes these and other deficiencies in the fuel cell art. The fuel cell system described herein comprises a reduced mass compression retention enclosure capable of accommodating variations in fuel cell stack build height and vehicle balance of plant component tolerances.

According to one embodiment, a fuel cell system comprises a fuel cell stack having a dry end unit plate and a wet end unit plate and a plurality of fuel cells disposed there between. The stack build height may vary with fuel cell count, but also may vary with stack component dimensional variation even where cell count is held constant. The compression retention system comprises a pair of opposing end caps, a pair of opposing side panels, and at least two rigid discrete bracketing elements with at least one bracketing element disposed exterior and vertically adjacent to each side panel for securing the wet end unit plate to the dry end unit plate, in part for retaining a compressive force which has been applied to the stack, and further to provide environmental sealing. The wet end unit plate is fixedly secured to the opposing end caps and the dry end unit plate is adjustably secured to the opposing end caps.

In some embodiments the opposing end caps may be extrusion-molded to comprise a plurality of vertically parallel T-slots configured to glidingly engage one or more captured fasteners which are adjustable along the T-slots to accommodate fuel cell stack build height and vehicle mounting tolerances, and the dry end unit plate and wet end unit plate may be molded to have a horizontal T-slot along each edge secured to a bracketing element, each T-slot configured to engage one or more captured fasteners adjustable along the length of the T-slot, such that the bracketing element is secured to the dry end unit plate and wet end unit plate by directly opposing capture fasteners, which position may be adjusted along the length of the T-slots.

Another embodiment provides methods for assembling a fuel cell system capable of accommodating variations in fuel cell stack build height. The methods comprise providing a fuel cell stack disposed between a dry end unit plate and a wet end unit plate; providing a compression retention enclosure having opposing end caps, and a pair of opposing side panels, and, optionally, at least two rigid discrete bracketing elements, with at least one bracketing element disposed exterior and vertically adjacent to each side panel. A primary function of the bracketing elements is to provide stack support in the event of vehicle impact. Methods further comprise fixedly securing the wet end unit plate to the end caps and bracketing elements while permitting the dry end unit plate to float in accordance with stack build height; applying a suitable compression load to the fuel cell stack; and adjustably securing the dry end unit plate to the end caps and bracketing elements. The compression retention enclosure may be mounted into the vehicle before the dry end is secured.

According to other embodiments, methods for substantially eliminating an effect of fuel cell stack build height variation on vehicle balance of plant components are provided, comprising mounting a fuel cell system in the vehicle wherein the fuel cell system comprises a fuel cell stack having a dry end unit plate and a wet end unit plate and a plurality of fuel cells disposed there between, and having a stack build height that varies with stack component dimensional variation, a compression retention enclosure comprising a pair of opposing end caps, a pair of opposing side panels, and, optionally, at least one rigid discrete bracketing element disposed exterior and vertically adjacent to each side panel. Mounting comprises fixedly securing the wet end unit plate while permitting the dry end unit plate to accommodate balance of plant component tolerances.

End caps and end unit plates may be extruded to provide lightweight components and to configure the adjustable fastening features. The end caps provide structural as well as compression retention functionality. Environmental sealing may be effectuated by structural components supplemented by simple face-sealing at one or more adjoining flush contact surfaces of enclosure components.

These and other advantages, embodiments and details may be more readily understood by reference to the drawings and detailed description set forth below.

BRIEF DESCRIPTION OF THE FIGURES

While the specification concludes with claims that particularly point out and distinctly claim embodiments of the invention, it is believed the present invention will be better understood from the following description of certain examples taken in conjunction with the accompanying drawings. In the drawings, like numerals represent like elements throughout the several views, and various components of the drawings are not necessarily illustrated to scale.

FIGS. 4A, 4B(1), 4B(2), 4C(1), and 4C(2) illustrate exemplary extruded end unit plates. FIG. 4B(1) depicts a schematic view of an exemplary extruded wet end unit plate showing a cathode feed port, and FIG. 4B(2) is a cut-away of the cathode feed port. FIG. 4C(1) depicts another exemplary embodiment of an extruded wet end unit plate showing a center rib running the length of the wet end unit plate partitioning the cathode feed port, and FIG. 4C(2) is a magnified cut-away view thereof.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention, it being understood, however, that this invention is not limited to the precise arrangements shown.

DETAILED DESCRIPTION

Features and benefits of the various embodiments of the present invention will become apparent from the following description and appended drawings, which include examples of specific embodiments, intended to give a broad representation of the invention. Various modifications will be apparent to those skilled in the art from this description and from practice of the invention. The scope is not intended to be limited to the particular forms disclosed and the invention covers all modifications, equivalents and alternatives falling within the spirit and scope of the invention as defined by the claims.

It is noted that terms like "preferably," "generally," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "approximately" are utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

The present disclosure provides a novel fuel cell system having a fuel cell stack assembly comprising a compression retention system simplifies that balance of plant component installation, and that provides dual functionality. In addition to providing the desired retained compression on the fuel cell stack, the system provides a structural role in vehicle mounting. In some embodiments, by replacing stamped-steel compression components of state-of-the-art systems with extruded aluminum and sheet plastic components, and by adapting the conventional end caps to provide both structural and compression retention functionality, the fuel cell systems described herein provide at least about a 10% reduction in mass, reduced tooling costs, reduced component lead time, provide simplified environmental sealing, and may be scaled easily for different cell counts. By fixing the wet end unit plate in position in the stack while permitting the dry end unit plate to float, known negative effects of stack height variation caused by stack component dimensional variances, and balance-of-plant complexities associated with having a variable wet end location in the vehicle, can be substantially eliminated.

Figure 1:
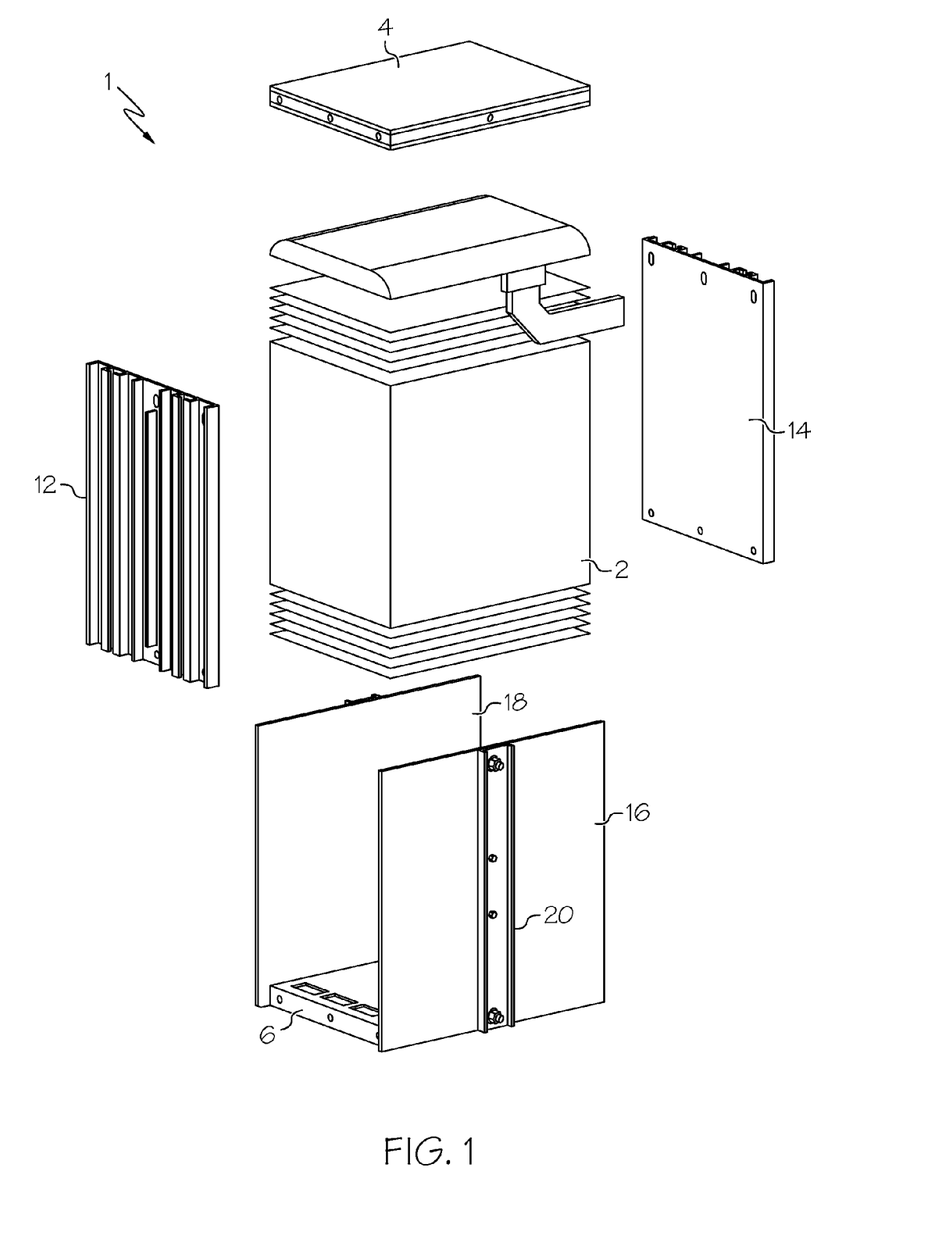
FIG. 1 depicts a schematic exploded view of a fuel cell system according to exemplary embodiments.
Figure 2A:
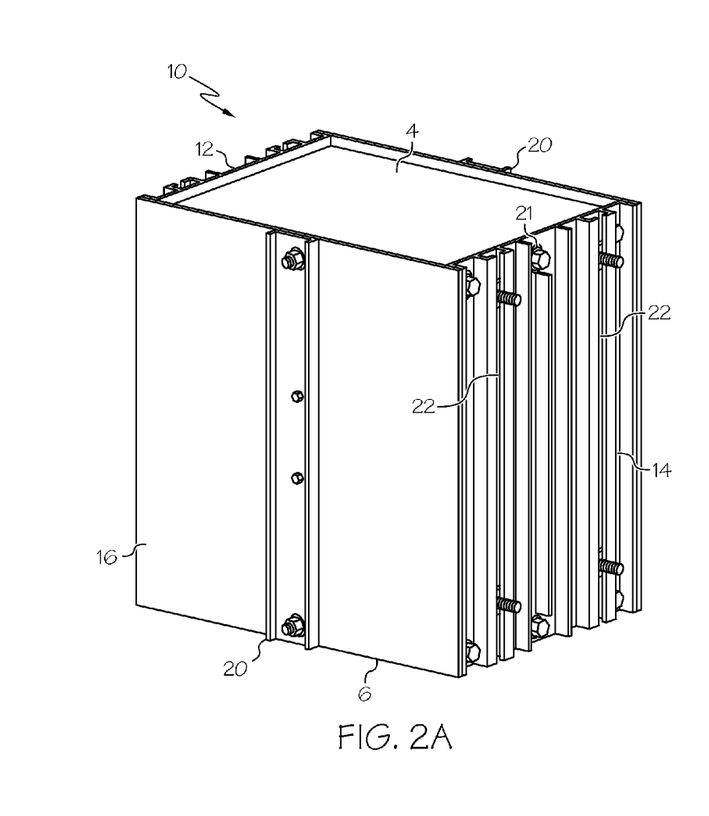
FIGS. 2A and 2B depict a schematic illustration of an exemplary compression retention enclosure according to the disclosure.
Figure 2B:
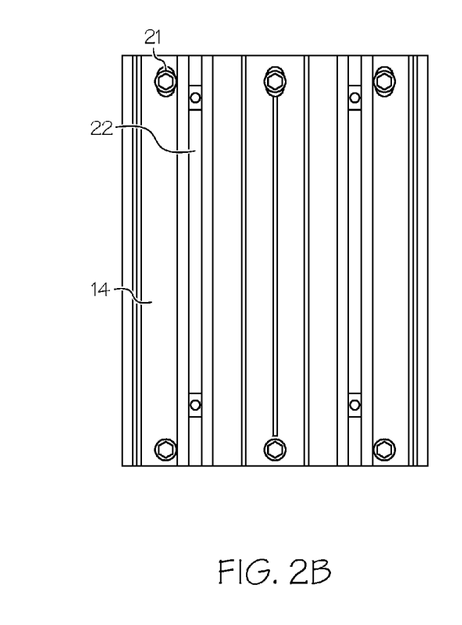

Referring to FIGS. 1, 2A and 2B, a fuel cell system 1 is illustrated and comprises a fuel cell stack 2 having a dry end unit plate 4 and a wet end unit plate 6 and a plurality of fuel cells 8 disposed there between. The fuel cell stack 2 has a stack height that varies with fuel cell count and/or component dimensional variation. The fuel cell system 1 comprises a compression retention system 10 comprising a pair of opposing end caps 12, 14, and, at least two rigid discrete bracketing elements 20 with at least one bracketing element disposed vertically along each side for securing the wet end unit plate 6 to the dry end unit plate 4. The compression retention system is further enclosed by a pair of opposing side panels 16, 18 such that the rigid discrete bracketing elements 20 are disposed adjacent and exterior the side panels 16, 18. In preferred embodiments the wet end unit plate 6 is fixedly secured to the opposing end caps 12, 14 and the dry end unit plate 4 is adjustably secured to the opposing end caps 12, 14. Herein the phrase "adjustably secured" indicates that the end-point secured position is not known until final assembly and the securing mechanism is adapted to accommodate a range of possible end-point securing positions. By "fixedly secured," it is meant that the positional relationship of the secured components to one another is substantially invariant.

Figure 3:
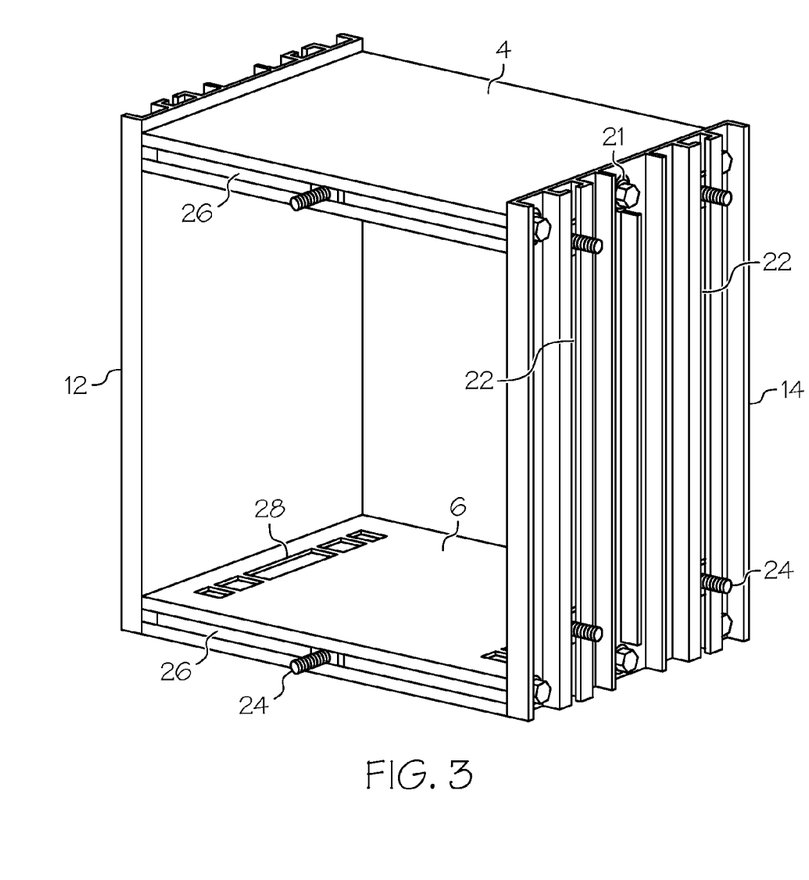
FIG. 3 depicts a schematic illustration of an exemplary compression retention enclosure with side panels and bracketing elements removed in order to show T-slots and adjustable captured fasteners along lateral edges of the wet and dry end unit plates according to specific embodiments.

Referring to FIGS. 2A, 2B and 3, the dry end unit plate 4 is adjustably secured to the end caps 12, 14 by fastening through vertically adjustable slots 21 located on the end caps 12, 14. The dry end unit plate 4 may be adjustably secured to the end caps 12, 14 according to a pre-operational fuel cell stack height. That is, after assembly of the fuel cell stack but prior to operation, the end-point position is determined and secured. Although conventional fuel cell stacks are built with a set number of cells, according to very specific embodiments the end-point secured position of the dry end unit plate may be adjusted to accommodate different cell counts. Within a fuel cell stack of a set number of fuel cells, however, the fuel cell stack height is known to depend on dimensional variation of the components of the fuel cell stack. For example, membrane swelling of the proton exchange membrane (PEM) component can occur with differences in environmental parameters such as humidity and temperature, and in response to compressive forces on the fuel cell stack. A typical fuel cell stack may comprise nearly 300 individual plating, gasket and cell components and the cumulative effect of even very small thickness variances in those components can amount to between a 5 and 10 percent variance in height of the entire stack.

Balance of plant (BOP) refers to components present in the vehicle, including but not limited to blowers, pumps, hoses, compressors, and the like, which are necessary for mounting and operability, but which are not part of the fuel cell system disclosed herein. The wet end is the unit end where most coolant and reactant inlets and outlets and related ducts and manifolds are located. In some known compression retention systems, structural retention means are employed, for example tie rods, side plates, springs and the like. The compressed stack is then placed in a structural enclosure that provides sealing function and vehicle mounting capability. While this design substantially eliminates the problems associated with a "floating wet end," it results in an undesirable redundancy in structural support. In systems which do not rely on structural enclosures, generally the install location of the dry end is fixed, and the wet end location is permitted to vary, driving BOP complexity. According to embodiments of the instant invention, the location of the wet end is fixed by studding to BOP components and only the dry end location varies with stack build variation, thus simplifying BOP tolerances.

In accordance with embodiments of the instant invention, the end caps are utilized as part of the compression retention system and are engaged to provide a substantial amount, or in specific embodiments, a majority of the retained compression force. In accordance with further embodiments of the invention, the end caps are configured to provide integration with vehicle mounting structures.

Known fuel cell systems provide environmental sealing in a variety of ways, including by enclosing a compression retention system in a separate structural enclosure, typically sealed with foam sealant along flush component edges. In accordance with embodiments of the instant invention, the compression retention system comprises lightweight side panels which function to protect the fuel cell stack assembly, and to provide environmental sealing. Light-weight plastic or light-gauge sheet metal may be used to provide side panels to fully enclose and environmentally seal the fuel cell stack. Environment sealing may be further effectuated by the use of simple face-sealing, for example by using pressure-sensitive adhesive along one or more adjoining flush surfaces of the enclosure components.

Plastics suitable for fabrication of the side panels 16, 18 are readily determinable by a person of skill in the art. Non-limiting examples of suitable sheeting plastics include Acrylonitrile-Butadiene-Styrene (ABS), Acetyl, Acrylic, Chlorinated Polyvinyl Chloride (CPVC), Nylon, Polycarbonate, Polyethylene LDPE, MDPE and HDPEs, Polypropylene, Polyurethane, Polyvinyl chloride (PVC), and styrene, and UHMW Polyethylene. Generally the plastics are provided in rigid or semi-rigid sheets. Suitable light-gauge metals are likewise readily determinable by a person of ordinary skill in the art. Non-limiting examples include steel, stainless steel, aluminum and zinc with preferred steel sheeting generally greater than 10 gauge. According to particularly preferred embodiments, the side panels comprise plastic side panels.

According to further embodiments, the opposing end caps 12, 14 and one or both of the dry end unit plate 4 and wet end unit plate 6 may be fabricated by any known means, including stamping, molding and extruding. In preferred embodiments, the opposing end caps 12, 14, and one or both of the dry end unit plates are fabricated by extruding, for example by extrusion of an extrudable metal or extrudable metal composite. In specific embodiments the extrudable metal comprises aluminum, and in very specific embodiments an aluminum skin may be disposed about all or a portion of an extruded component.

In order to provide a mechanism for adjustably securing components, the opposing end caps 12, 14 may be molded to comprise a plurality of vertically parallel T-slots 22 configured to glidingly engage one or more captured fasteners 24 which are adjustable along the T-slots 22 to accommodate fuel cell stack build height and vehicle mounting tolerances. Hence, the compression retention system in accordance with the invention provides dual functionality; it acts to retain a desired compressive force on the fuel cell stack, and further provides a structural role by integrating with vehicle mounting.

The dry end unit plate 4 and wet end unit plate 6 may be molded to have a horizontal T-slot 26 along each edge secured to a bracketing element 20, with each horizontal T-slot 26 configured to engage one or more captured fasteners 24 adjustable along the length of the horizontal T-slot 26, such that the bracketing element 20 is further secured to the dry end unit plate 4 and wet end unit plate 6 by directly opposing capture fasteners 24, which position may be adjusted along the length of the T-slots 26. In this way, the position of the bracketing elements 20 is horizontally adjustable along the length of the compression retention enclosure. According to specific embodiments, the rigid discrete bracketing elements 20 comprise steel, but may be fabricated from any suitably rigid structural material.

Figure 4A:
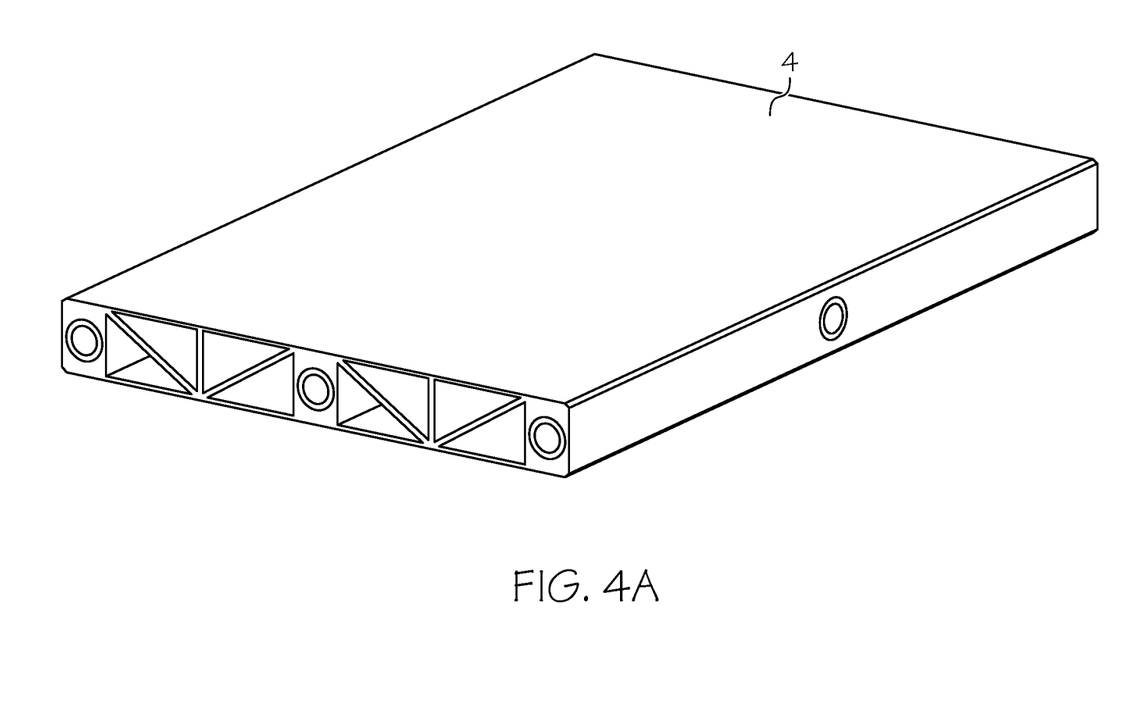
FIG. 4A depicts a schematic view of an extruded dry end unit plate.
Figure 4B:
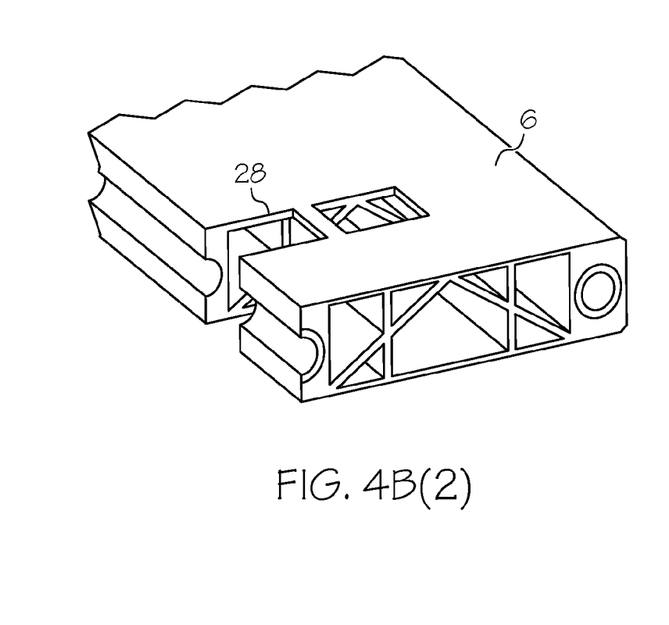
Figure 4C:
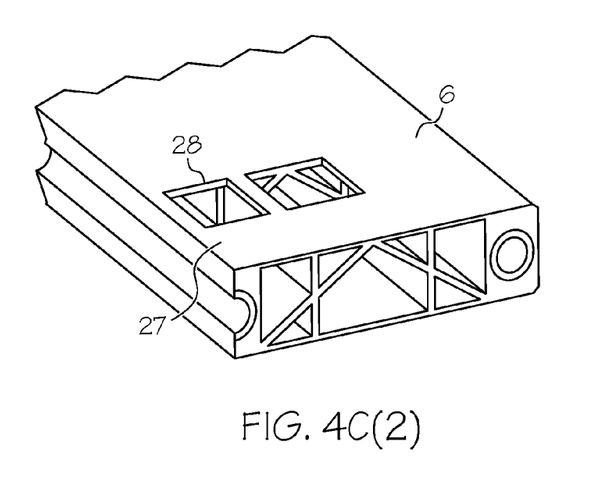

Referring to FIGS. 4A, 4B(1), 4B(2), 4C(1) and 4C(2), in preferred embodiments, the wet end unit plate 6, which provides inlets, outlets and manifolds for reactant and coolant flow, may be fabricated to provide additional structural features such as ribbing for strength, and may be fabricated to comprise reactant and coolant flow ports and associated channels. Ribbing may be utilized to strengthen the plate. In specific embodiments the wet end unit plate 6 may be fabricated with ribbing, and in very specific embodiments may be fabricated to comprise a full-length center rib 27 partitioning, for example, a cathode feed port 28, and providing greater structural strength and simplicity.

A further embodiment of the invention is directed to methods for assembling a fuel cell system 1 capable of accommodating variations in fuel cell stack 2 build height. A method may comprise providing a fuel cell stack 2 disposed between a dry end unit plate 4 and a wet end unit plate 6; providing a compression retention enclosure 10 having opposing end caps 12, 14, a pair of opposing plastic side panels 16, 18, and, in some embodiments, at least two rigid discrete bracketing elements 20 with at least one disposed exterior and vertically adjacent to each side panel 16, 18; fixedly securing the wet end unit plate 6 to the end caps 12, 14 and bracketing elements 20 while permitting the dry end unit plate 4 to float in accordance with stack build height; applying a suitable compression load to the fuel cell stack 2; and adjustably securing the dry end unit plate 4 to the end caps 12, 14 and bracketing elements 20 thereby retaining a compression force on the fuel cell stack. The end caps provide a majority of the retained compressive force and two or more discrete bracketing elements 20 may supplement the retention, although the primary function of the bracketing elements is to provide support to the stack in the event of vehicle impact, for example.

The compression retention system 10 is mounted into a vehicle by fixedly securing the wet end unit location to BOP components. The majority of BOP features are located at or beneath the wet end unit. Hence, by fixing the location of the wet end relative to the BOP, tolerances for variations in stack height may be accommodated. Although the relative position of the dry end may change from vehicle to vehicle, the impact on vehicle mounting and BOP tolerances is greatly diminished.

The end caps 12, 14 may be fabricated, such as by extruding, to comprise a plurality of vertically parallel T-slots 22 configured to glidingly engage one or more captured fasteners 24 which are adjustable along the T-slots 22 to accommodate the float of the dry end unit plate 4. Vertical slots 21 located at the dry-end fastening end of the end caps 12, 14 permit the dry end unit plate 4 to be secured, for example by bolting through the vertical slots 21, to the end caps 12, 14 upon securing to end-point positioning. In specific embodiments the dry end unit plate 4, wet end unit plate 6 and end caps 12, 14 may be extrusion-molded from an extrudable aluminum or aluminum composite and in very specific embodiments an aluminum skin may be disposed about the surface of an extrusion-molded component.

Further embodiments of the invention are directed to methods for substantially eliminating negative effects of fuel cell stack build height variation on vehicle balance of plant components. In accordance with some embodiments of the instant invention, the wet end unit mounting studs are fixed at the bottom in vehicle position, and the mounting location of the wet end unit and its location relative to the BOP is substantially invariant from vehicle to vehicle. The location of the dry end unit, on the other hand, may vary by as much as 5-10% in accordance with stack height variance. Hence, adjustable fasteners are provided on the end caps to accommodate vehicle mounting tolerances.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

The invention claimed is:

1. A fuel cell system comprising:
   a fuel cell stack having a dry end unit plate and a wet end unit plate and a plurality of fuel cells disposed there between, and having a stack height;
   an environmentally sealed compression retention system comprising
      a first end cap disposed opposite a second end cap,
      a pair of opposing side panels, each side panel extending from the wet end unit plate to the dry end unit plate and from the first end cap to the second end cap, and
      at least two rigid discrete bracketing elements, at least one said rigid discrete bracketing element disposed exterior and vertically adjacent to each side panel from the wet end unit plate to the dry end unit plate for securing the wet end unit plate to the dry end unit plate;
   wherein the wet end unit plate is fixedly secured to the first end cap and the second end cap prior to application of a compressive force, and the dry end unit plate is adjustably secured to the first end cap and the second end cap to retain the compressive force,
   further wherein the dry end unit plate, the wet end unit plate, the first end cap and the second end cap, and the opposing side panels form the environmentally sealed compression retention system without additional enclosure.

2. The fuel cell system according to claim 1, wherein the dry end unit plate is adjustably secured to the end caps by fastening through vertically adjustable slots located on the end caps.

3. The fuel cell system according to claim 1, wherein the dry end unit plate is adjustably secured to the end caps according to a pre-operational fuel cell stack build height.

4. The fuel cell system according to claim 1, wherein the side panels comprise a plastic sheet material or a sheet metal.

5. The fuel cell system according to claim 4, wherein the plastic sheet material is selected from acrylonitrile-butadiene-styrene, acetyl, acrylic, chlorinated polyvinyl chloride, nylon, polycarbonate, low-density polyethylene, medium-density polyethylene, high-density polyethylene, polypropylene, polyurethane, polyvinyl chloride, and styrene, and ultra-high molecular weight polyethylene.

6. The fuel cell system according to claim 1, wherein the opposing end caps, the dry end unit plate and wet end unit plate are fabricated by extruding an extrudable metal or an extrudable metal composite.

7. The fuel cell system according to claim 6, wherein the extrudable metal comprises aluminum.

8. The fuel cell system according to claim 6, wherein the opposing end caps comprise a plurality of vertically parallel T-slots configured to glidingly engage one or more capture fasteners which are adjustable along said vertically parallel T-slots.

9. The fuel cell system according to claim 1, wherein the dry end unit plate comprises a first dry end T-slot disposed along a first dry end plate exterior edge and a second dry end T-slot disposed along an opposing second dry end plate edge, said first and second dry end plate edges being perpendicular to the opposing end caps, and further wherein the wet end unit plate comprises a first wet end T-slot disposed along a first wet end edge and a second wet end T-slot disposed along an opposing second wet end edge, said first and second opposing wet end edges being perpendicular to the opposing endcaps, said first dry end, second dry end, first wet end and second wet end T-slots being configured to engage one or more fasteners adjustable along the T-slot, such that the bracketing element is secured to the dry end unit plate and wet end unit plate by directly opposing capture fasteners.

10. The fuel cell system according to claim 8, wherein the capture fasteners in the vertically parallel T-slots function to adjustably mount the compression retention system in a vehicle.

11. A fuel cell system according to claim 6, wherein the extruded wet and dry end unit plates are configured to comprise structural ribbing and reactant and coolant ports.

12. The fuel cell system according to claim 1, wherein the compression retention system is environmentally sealed and mounted into a vehicle in the absence of any additional structural enclosure.

* * * * *